United States Patent
Becker

[11] Patent Number: 6,040,694
[45] Date of Patent: Mar. 21, 2000

[54] METHOD AND DEVICE FOR DETERMINING THE THICKNESS OF AN ELECTRICALLY CONDUCTIVE LAYER

[75] Inventor: Erich Becker, Marl, Germany

[73] Assignee: Siemens Aktiengesellschaft, Munich, Germany

[21] Appl. No.: 09/103,161

[22] Filed: Jun. 22, 1998

Related U.S. Application Data

[63] Continuation of application No. PCT/DE96/02383, Dec. 10, 1996.

[30] Foreign Application Priority Data

Dec. 22, 1995 [DE] Germany .................. 195 48 508

[51] Int. Cl.[7] .................. G01B 7/06; G01B 101/00; G01B 121/02; G01R 33/12
[52] U.S. Cl. .................. 324/230; 324/236
[58] Field of Search .................. 324/229, 230, 324/231, 239, 236

[56] References Cited

FOREIGN PATENT DOCUMENTS 33 35 080 A1  4/1984  Germany .

OTHER PUBLICATIONS

"Thickness and conductivity of metallic layers from eddy current measurements" (Moulder et al.), 8127 Review of Scientific Instruments, vol. 63, No. 6, New York 1992.

"Non–destructive testing of corrosion effect on high–temperature protective coatings" (Dibelius et al.), VGB Research Project No. 54, Nuclear Technology, vol. 70, No. 9, 1990.

*Primary Examiner*—Walter E. Snow
*Attorney, Agent, or Firm*—Herbert L. Lerner; Laurence A. Greenberg; Werner H. Stemer

[57] ABSTRACT

The invention relates to a method according to the eddy-current testing principle, and to a device for determining the thickness of an electrically conductive protective layer which is applied to an electrically conductive base material. The electrical conductivities of the protective layer and of the base material are different from each other. An excitation coil through which a high-frequency electric current is passed is brought near to the protective layer, so that an electric eddy current is produced in the protective layer and possibly in the underlying base material. A parameter related to the impedance of a probe coil is determined and is used as a basis for determining the thickness of the protective layer, for example by comparison with known reference values. The frequency of the high-frequency electric current is selected in such a way that the thickness of the protective layer is determined unambiguously for a ratio of the electrical conductivities of between 0.7 and 1.5.

12 Claims, 2 Drawing Sheets

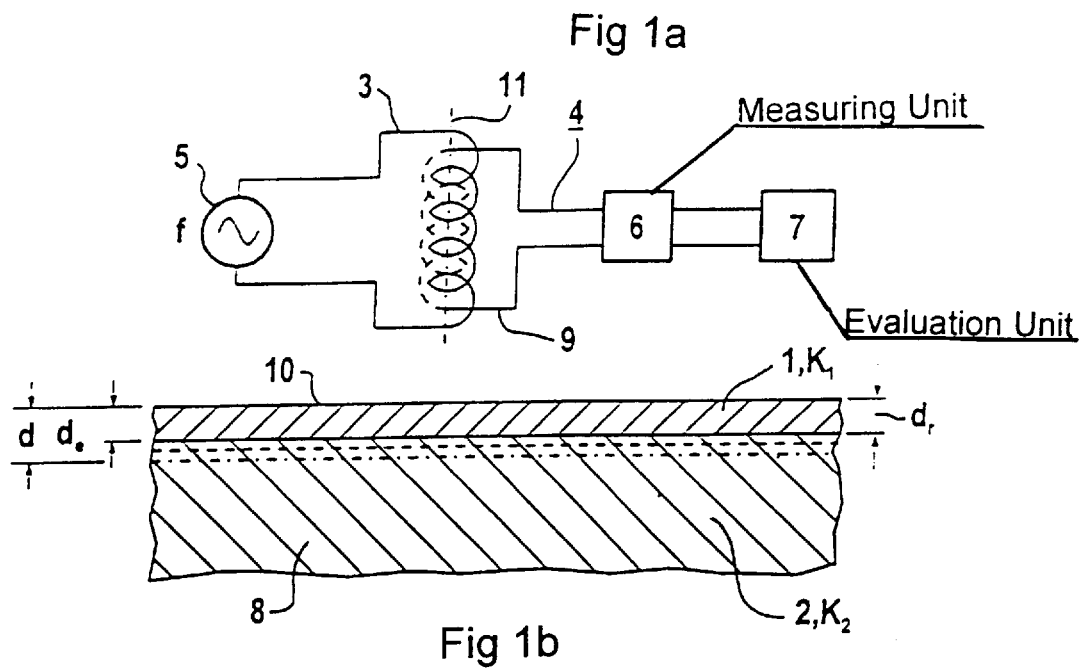
Fig 1a
Fig 1b
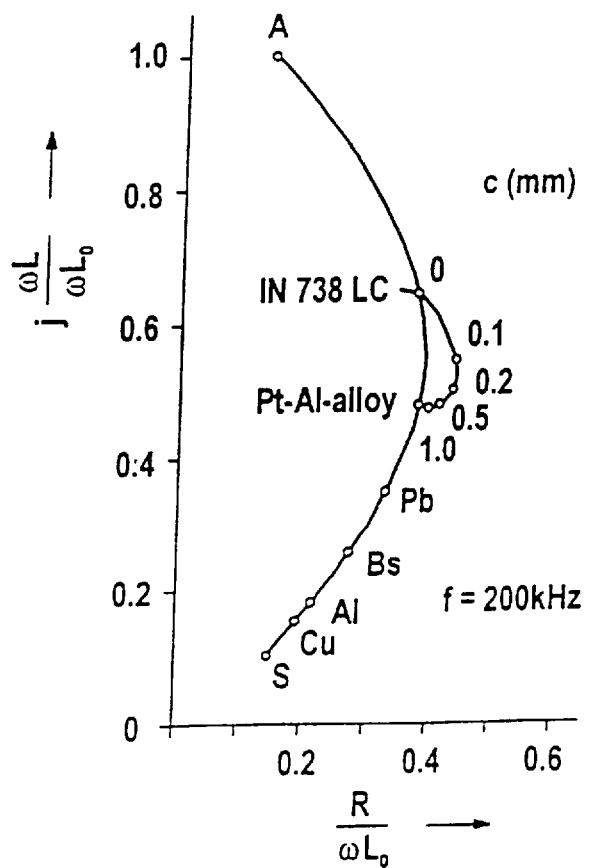
FIG 2

METHOD AND DEVICE FOR DETERMINING THE THICKNESS OF AN ELECTRICALLY CONDUCTIVE LAYER

CROSS-REFERENCE TO RELATED APPLICATION

This is a continuation of International Application PCT/DE96/02383, filed on Dec. 10, 1996, which designated the United States.

BACKGROUND OF THE INVENTION

1. Field of the Invention

The invention relates to a method and to a device for determining the thickness of an electrically conductive protective layer of a component of a turbine system. The protective layer has an electrical conductivity $\kappa_1$ and is applied to a base material having an electrical conductivity $\kappa_2$. The electrical conductivities $\kappa_1$ and $\kappa_2$ are different from each other.

Various methods for determining the thickness of a corrosion protection layer for a gas turbine blade are described in the article titled "Non-destructive Testing of Corrosion Effects on High-temperature Protective Coatings" in VGB-Kraftwerkstechnik 70 (1990) No. 9, pages 645 to 651, by G. Dibelius, H. J. Krichel and U. Reimann. One of the methods described is the so-called "eddy-current measurement method", in which the different electrical conductivities of the protective layer and of the base material are employed. Using a flat coiled copper probe which is applied to a flexible support, for example, a printed conductor, an eddy current is induced in the gas turbine blade. To this end, a high-frequency alternating electric current is applied to the probe and the impedance of the probe is recorded. For a fixed frequency of an alternating electric current, a characteristic value of the impedance results as a function of the thickness of the layer, the material of the layer and the material of the base material. In the article, the thickness of the layers were examined as a function of the impedance for a protective layer made of a platinum-aluminum alloy on a base material, an IN 738 LC stainless steel. The impedance of the layers having a thickness of up to 1 mm were measured at a frequency between 200 kHz and 500 kHz. However, the article does not contain information regarding either the values or the ratio of the electrical conductivities nor information regarding the accuracy and reproducibility of the measurement of the gas turbine blades with an unknown layer thickness for determining the thickness of the layer.

A method for determining the thickness of a zirconium coating on the inside of a zirconium alloy tube used in nuclear reactor fuel elements is described in Non-prosecuted, German Patent Application No. 33 35 080 A1. The determination method uses the eddy-current testing principle, in that the impedance variation of a coil is evaluated by a high-frequency eddy-current field induced in the zirconium coating. The frequency for the high-frequency eddy-current field is selected in such a way that an impedance variation attributable to the so-called lifting-off of the excitation coil can be discriminated clearly from an impedance variation because of the thickness of the layer. Frequencies suitable for this purpose are in the range between 6 MHz to 20 MHz. The thickness of the zirconium layer extends from 10 $\mu$m to about 100 $\mu$m, the resistivity of the zirconium layer is approximately $40*10^{-8}$ $\Omega$m, and the resistivity of the base metal, the zirconium alloy, is approximately $74*10^{-8}$ $\Omega$m. The conductivity of the zirconium layer is therefore about twice the conductivity of the base metal. Using the described eddy-current testing method for applications in the nuclear technology field, the intention is to be able to carry out a determination of the zirconium layer thickness with a deviation of about 5 $\mu$m accuracy.

SUMMARY OF THE INVENTION

It is accordingly an object of the invention to provide a method and a device for determining the thickness of an electrically conductive layer which overcome the hereinafore-mentioned disadvantages of the heretofore-known devices and methods of this general type, and which provides a method for determining the thickness of an electrically conductive layer which has an electrical conductivity $\kappa_1$ which is applied to a base material which has an electrical conductivity $\kappa_2$. The electrical conductivities $\kappa_1$ and $\kappa_2$ being different from each other, in which a reliable determination of the thickness of the layer is ensured even when the electrical conductivities $\kappa_1$ and $\kappa_2$ are almost equal to each other. A further object of the invention is to provide a device for carrying out the method.

With the foregoing and other objects in view there is provided, in accordance with the invention, a method for determining a thickness of a protective layer of a component, which includes: providing a component having a protective layer with an electrical conductivity $\kappa_1$ and a base material with an electrical conductivity $\kappa_2$, the protective layer is disposed on the base material and the electrical conductivity $\kappa_1$ and the electrical conductivity $\kappa_2$ are different from each other; applying a high-frequency electric current to an excitation coil, the excitation coil is coupled to a probe coil; moving the excitation coil near to the protective layer to produce an electric eddy current in at least the protective layer; determining a parameter related to an impedance of the probe coil, using the determined parameter, according to an eddy-current testing principle, as a basis for determining a thickness of the protective layer; and selecting a frequency of the high-frequency electric current, based on the eddy-current testing principle, to unambiguously determine the thickness of the protective layer where a ratio $\kappa_2/\kappa_1$ of the electrical conductivities is between 0.7 and 1.5.

The object of the invention relating to the method is achieved in that an excitation coil, through which a high-frequency or radio-frequency electric current is passed, is brought near to the protective layer so that an electric eddy current is produced in the layer and the underlying base material. The frequency of the high-frequency electric current is selected in such a way that a parameter (quantity) related to the impedance of a probe coil is determined. The parameter related to the impedance is used, according to the eddy-current testing principle, as a basis for determining the thickness of the protective layer. The frequency is selected in such a way that, according to the eddy-current testing principle, the thickness of the protective layer is determined unambiguously for a ratio of the electrical conductivities of between 0.7 and 1.5.

In this case it is possible, as for example as described in the book "Schichtdickenmessung" [Layer Thickness Measurement] by D. Herrmann, R. Oldenbourg Verlag, Munich, 1993, section 3.6, pages 121 to 159, or the book "Zerstörungsfreie Werkstück- und Werkstoffprüfung" [Non-destructive testing of workpieces and materials] by S. Steeb, expert verlag, Ehningen, 2nd edition, 1993, chapter 8, pages 334 to 370, for the excitation coil to be the same as the probe coil or for two different coils to be used. The above two books also show which of the parameters related to the impedance are used in eddy-current testing methods, for example the impedance of the excitation coil directly, or its phase angle, the induced voltage of a probe coil and a differential signal between two probe coils connected in opposition. The coils may be used as planar coils or as coils wound along an axis. The latter are suitable, in particular, for producing a relatively strong magnetic field and, because of their small cross-section, for scanning curved surfaces. The probe and the excitation coils may be wound in one another, or they may be disposed as mutually separated transformer coils. Regarding the structure and the arrangement of the coils, and the general implementation of the eddy-current testing method, reference may fully be made to the above two books which are hereby incorporated by reference.

In accordance with an added feature of the invention, there is the step of selecting the frequency to cause a penetration depth of the electric eddy current to be greater than a maximum expected thickness of the protective layer. In particular, the penetration depth of the eddy current is up to about four times the maximum expected thickness of the protective layer. The penetration depth of the eddy current into the protective layer and into the underlying base material is of the order of the maximum expected thickness of the layer. By virtue of a frequency of the high-frequency electric current, at which the penetration depth of the eddy current is of the order of the maximum expected thickness of the layer, the effect of the layer stands out particularly clearly, so that the method ensures the determination of the layer thickness with high accuracy even when the electrical conductivities are only slightly different from each other. Selection is made while taking the electrical conductivities into account. In this case, account is taken of the fact that, at a frequency which leads to a penetration depth smaller than the thickness of the layer, a value of the parameter related to impedance is produced which is imposed almost exclusively by the electrical conductivity of the layer. For the effect of simplicity, the term impedance will itself be used directly when referring to the parameter, it being, however, clear that any possible parameter may be chosen instead of the impedance. If the frequency is selected in such a way that the penetration depth of the eddy current produced is considerably greater than the thickness of the layer, then the effect of the electrical conductivity of the base material on the impedance can increase. Primarily when the electrical conductivities of the layer and of the base material are only slightly different from each other, it may possibly be very difficult in the above two cases to demonstrate a dependence of the impedance on the layer thickness within the framework of the experimental error of the measurements. In contrast, at a frequency which leads to an eddy current having a penetration depth of the order of the thickness of the layer, a significant dependence of the measurement signal, for example the impedance, on the actual layer thickness is present, which dependence can be discriminated clearly from possible measurement errors. Experiments have surprisingly shown that the measured signals obtained by this method are a factor of about 1000 greater than when using the hitherto known fixed frequencies. The method is therefore suitable for determining the thickness of a layer with a substantially arbitrary geometry, especially layer curvature and roughness, because the signals which can be obtained can also be discriminated clearly from geometrical effects. The electrical conductivities may differ only slightly, for example in the range from about 10% to about 15%.

The frequency is preferably selected in such a way that, the penetration depth is greater than the maximum expected thickness, especially up to about four times the maximum expected thickness. Since a maximum expected layer thickness is generally already known by virtue of the process by which the layer is produced, for example dip-coating, spraying, electrolytic deposition, etc., from the process parameters, selection of the frequency in view of the expected layer thickness is readily possible. For this purpose it is not necessarily required to select a preferred frequency, matched to the expected layer thickness, using one or more test measurements with different frequencies. With the frequency matched to an expected layer thickness, a high, unambiguously discriminatable and evaluatable measurement signal is furthermore ensured even in the event that the layer has been eroded over time. This is advantageous especially for components, such as gas turbine blades, which are thermally loaded and are exposed to corrosion.

In accordance with an additional feature of the invention, there is the step of selecting the frequency of the high-frequency electric current to be between 1.5 MHz and 3.5 MHz. In the preferred embodiment, the high-frequency electric current is to be between 2 MHz and 3 MHz. This frequency range is particularly advantageous for layer thickness determination with a layer thickness of up to 500 $\mu$m. This is appropriate primarily for a layer which is used as a corrosion protection layer of a gas turbine blade and, for example, a protection layer having a nickel-chromium-aluminum alloy with added yttrium. The typical layer thickness may be in the range between 200 $\mu$m and 400 $\mu$m.

In accordance with another feature of the invention, there is the step of forming a mechanical contact between the excitation coil and the protective layer where the excitation coil is electrically insulated from the protective layer for determining the parameter related to the impedance of the probe coil.

The basis used for determining the thickness of the layer is preferably the value of the impedance which occurs with mechanical contact between the excitation coil and the layer, where the excitation coil being electrically insulated from the layer. Both the excitation coil and the probe coil are preferably configured as feelers extending along an axis. They may each have a cross-section of about 3 mm and be separated from each other by about 4 mm. Where appropriate, the coils may be applied in planar fashion, for example as copper conductors, on a flexible and deformable support body. The mechanical contact between the coil and the layer may be improved by pressing the coil onto the layer, for example by using pressurized air.

In accordance with yet another added feature of the invention, there are the steps of using a test measurement with a predeterminable test frequency for determining a maximum expected thickness of the protective layer, and determining the frequency based on the predeterminable test frequency used to determined the maximum expected thickness and the conductivities $\kappa_1$ and $\kappa_2$.

In accordance with yet another additional feature of the invention, there are the steps of providing a set of components with known protective layer thicknesses to be used as test specimens; determining for each of the test specimens the parameter related to the impedance of the probe coil using a plurality of different proximity frequencies; and selecting from the plurality of different proximity frequencies a proximity frequency generating a parameter related to the impedance with a sufficiently high resolution and high linearity as the frequency for the high-frequency electric current.

In accordance with yet another feature of the invention, there are the steps of providing preliminary test specimens coated with the protective layer; using a multiplicity of test frequencies on the preliminary test specimens and monitoring a resolution of the parameter related to the impedance of the probe coil for each test frequencies; and determining which of the multiplicity of test frequencies generate the parameter related to the impedance of the probe coil with a good resolution; and selecting the proximity frequencies from the multiplicity of test frequencies generating the parameter related to the impedance of the probe coil with the good resolution.

In accordance with a further added feature of the invention, there is the step of providing preliminary test specimens having simple geometric shapes.

As already mentioned above, the selection of the frequency of the high-frequency electric current may be determined with reference to the production process and to the external conditions to which the layer has been exposed. It is likewise possible to carry out a rough determination of the thickness of the layer using a test measurement with one test frequency, and therefrom to establish a frequency which ensures particularly large (accurate) measurement signals for the impedance. It is also possible to carry out a plurality of test measurements of different test frequencies. It is also possible to establish a frequency which is particularly suitable for carrying out the method by using optimization and interpolation methods.

A further preferred method for determining a suitable frequency consists in providing a set of specimens, each specimen respectively consisting of a base material and a layer with a respective thickness, and the specimen preferably corresponding, in terms of production and geometry, to the component to be tested. The specimens may in this case be parts of a component intended for use in a gas turbine system, in particular a gas turbine compressor blade. A plurality of proximity values are selected for the frequency, and the eddy-current testing method is carried out for each specimen using these proximity values, optionally repeatedly up to ten times in each case. From these proximity frequencies, a particularly suitable proximity frequency for application of the method to an actual component is selected. The chosen suitable proximity frequency leading to a particularly high resolution in the establishment of the layer thickness and to a particularly high linearity as a function of the layer thickness. The plurality of proximity frequencies may, for their part, be established by selecting from a multiplicity of test frequencies. The specimens, in particular specially produced geometrically simple bodies which are provided with the layer, are used with these test frequencies. By virtue of such a successive selection of a particularly suitable frequency directly on a component essentially equivalent to the component to be tested, accurate establishment of the layer thickness is ensured even with small differences in conductivity between the layer and the base material.

In accordance with a further additional feature of the invention, there is the step of comparing the parameter related to the impedance of the probe coil with reference values and determining the thickness of the protective layer from the results of the comparison. The impedance of a coil which is established using the method is preferably compared with reference values and the thickness of the layer is determined therefrom. The reference values may be established with the aid of reference coatings with exact verification of the thickness of the layer, for example by sectioning the layer or the like. Using a small or large number of reference values of the impedance for a layer made of a known material, which is applied to a known base material, interpolation methods can be used to establish a wealth of reference values of the impedance with a layer thickness unambiguously assigned in each case.

In accordance with a concomitant feature of the method of the invention, there is the step of providing a gas turbine blade as the component having the protective layer, the gas turbine blade is formed of an MCrAlY alloy type, M standing for a metal selected from the group consisting of iron, nickel, cobalt and an alloy thereof, Cr standing for chromium, Al standing for aluminum, and Y standing for a metal selected from the group consisting of yttrium, hafnium and a similar metal. By way of example, the alloy has the following components in per cent by weight: 30%–32% Co, 30% Ni, 28%–30% Cr, 7%–9% Al, 0.5% Y and about 0.7% Si.

The method is preferably suitable for determining the thickness of a protective layer on a component of a gas turbine system, in particular in the case of a gas turbine blade or of a compressor blade. This is above all true since even the complex geometry of the component, possibly existing bores under the surface of the layer and fluctuations in the thickness of the layer and in the thickness of the base material have at most only a small effect on the testing process.

In comparison with methods using an invariant frequency in the range of 200 KHz to 500 KHz, the method also provides unambiguous and accurate results for the thickness of the protective layer if the ratio of the conductivity of the base material to the conductivity of the layer is between 0.3 and 3.0, and in particular between 0.7 and 1.0. Ratios of this type of the order of 1 occur, for example, with an above-mentioned protective layer and a stainless steel, for example IN 738 LC. In this case, the ratio of the conductivities is approximately 0.79. In the case of a newly coated gas turbine blade, the thickness of the protective layer is in a range of up to about 400 µm.

With the foregoing and other objects in view there is also provided, in accordance with the invention, a device for determining a thickness of a protective layer of a component, the device includes: a high-frequency alternating current source; an excitation coil connected to the high-frequency alternating current source for receiving an alternating current to induce an electrical eddy current in at least a protective layer coated on a base material of a component under test, the base material has an electrical conductivity $\kappa_2$, the protective layer has an electrical conductivity $\kappa_1$, the electrical conductivity $\kappa_1$ and the electrical conductivity $\kappa_2$ being different from each other; a measuring unit; a probe coil connected to the measuring unit for determining an impedance, the probe coil is coupled to the excitation coil; and an evaluation unit is connected to the measuring unit for determining a thickness of the protective layer of the component where a ratio $\kappa_2/\kappa_1$ of the electrical conductivities is between 0.7 and 1.5.

The object relating to the device for carrying out the method is achieved by a device which has an excitation coil which is connected to an alternating current source and coupled to a probe coil. The probe coil is connected to a measuring unit for impedance determination and the measuring unit is connected to an evaluation unit for determining the thickness of the layer. The impedance is preferably compared with a set of reference values in the evaluation unit. The reference values have been determined beforehand from a layer with a composition identical to that of the layer to be examined and likewise with an identical base material. The reference values are stored in the evaluation unit. The evaluation unit may have a suitable device for representing the results of the method, for example a display monitor, a printer, a recording instrument or a plotter. The thickness of the layer to be examined is determined by the comparison carried out in the evaluation unit.

In accordance with a concomitant feature of the invention, the excitation coil is flexible for allowing a good mechanical contact with the protective layer of the component. The excitation coil and the probe coil are preferably configured in such a way that they can be matched, in particular flexibly, to the contour and surface of the layer. They are preferably separated from each other and DC coupled. Each coil is preferably wound helically along an axis. A detector including the excitation coil and the probe coil is matched to the component to be tested, in particular in terms of its area and its screening. It is configured in such a way that the electric field produced by the detector is concentrated onto a narrow region at which the measurement is carried out. The device is preferably operated in accordance with a resonance method. In this case, use is made of the fact that the imaginary part and the real part of the impedance vary if the probe coil is moved from a position in which it is directly in contact with the base material into a position having direct contact with the layer. If the conductivity of the layer is greater than the conductivity of the base material, then under such a positional change the real part of the impedance becomes larger and the imaginary part decreases. If the probe coil, which represents an inductor, is connected to a particularly low-loss capacitor to form a resonant tuned circuit, then the capacitor is selected in such a way that a maximally large signal is achieved with mechanical contact between the excitation coil and the layer. As a result of the increase in the real part of the impedance, the maximum in the resonance curve decreases considerably and, because of the smaller imaginary part of the impedance, the maximum is shifted to higher frequencies. By a corresponding configuration of the tuned circuit, a twofold increase in the measurement signal for determining the thickness may be achieved.

Other features which are considered as characteristic for the invention are set forth in the appended claims.

Although the invention is illustrated and described herein as embodied in a method and a device for determining the thickness of an electrically conductive layer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1a is a circuit block diagram of a device for determining a thickness of a protective layer of a component according to the invention;

FIG. 1b is a sectional view of the component having a base material and a layer applied thereto;

FIG. 2 is a graph of an impedance in a complex plane for various materials; and

DESCRIPTION OF THE PREFERRED EMBODIMENTS

Figure 3:
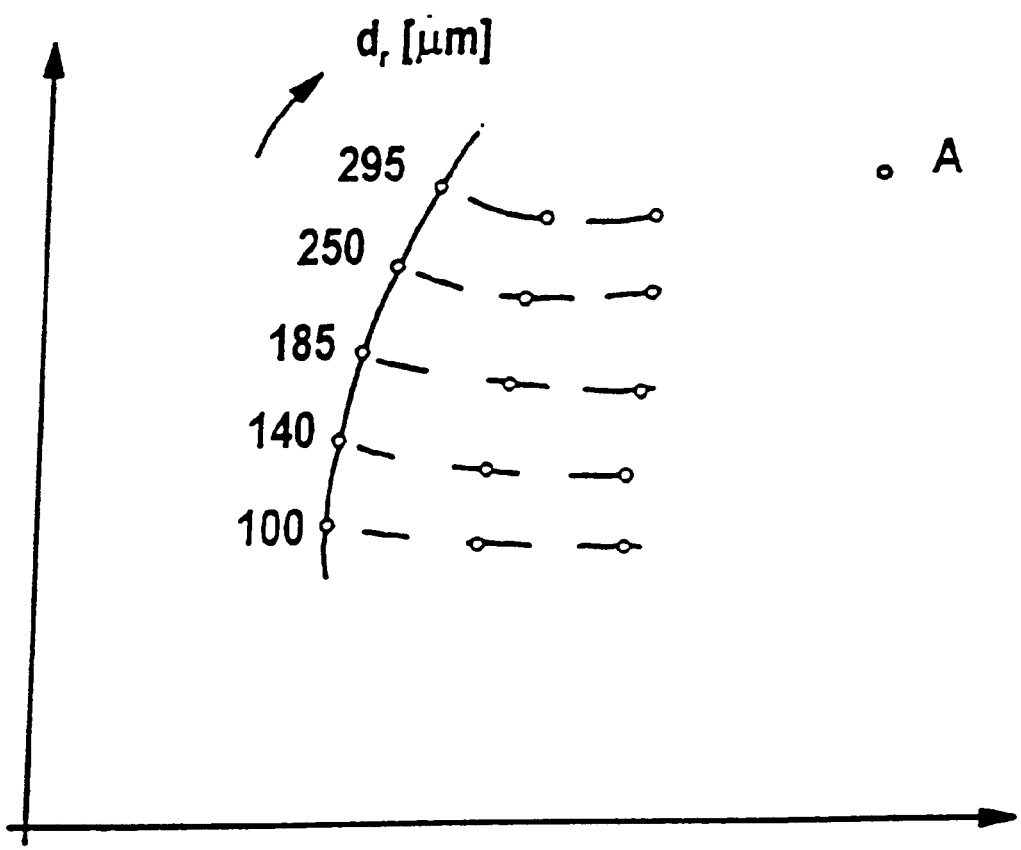
FIG. 3 is a graph of the impedance in the complex plane for a plurality of protective layers, each having a different thickness, of a gas turbine blade.

Referring now to the figures of the drawing in detail and first, particularly, to FIGS. 1a and 1b thereof, there is shown a component 8 in a longitudinal section and a device 4 for determining the thickness of a layer 1 of the component 8. It is noted that FIGS. 1a and 1b are not to scale relative to the each other. The layer 1 has a thickness $d_r$ and is applied to a base material 2 of the component 8. The layer 1 is formed of an electrically conductive material and is, for example, a corrosion protection layer for a gas turbine compressor blade. The base material 2 is likewise electrically conductive and consists, for example, of a stainless steel, such as IN 738 LC. The device 4 has an excitation coil 3, wound helically essentially along an axis 11. The excitation coil 3 is connected to an alternating current source 5, so that a high-frequency or radio-frequency alternating electric current with a frequency f can be fed in through the excitation coil 3. The excitation coil 3 is DC coupled to a probe coil 9, likewise wound along the axis 11. The probe coil 9 is connected to a measuring unit 6 for determining an impedance, or a parameter (quantity) related to the impedance, such as an induced voltage or a phase angle, of the excitation coil 3 or of the probe coil 9. The measurement unit 6 is connected to an evaluation unit 7 for determining the thickness $d_r$ of the layer 1. In the measuring unit 6, a measurement signal unambiguously related to the impedance of the excitation coil 3, or the impedance itself, is acquired. In the evaluation unit 7, a parameter representing the impedance is compared with reference values stored therein. These reference values have been established for the same combination of materials between the layer 1 and the base material 2 for layers of well-defined thickness. Since the reference values are unambiguously related to a thickness of an equivalent layer, an accurate determination of the thickness $d_r$ of the layer takes place by the comparison. In the case of a material combination such that the layer 1 is a corrosion protective layer for a gas turbine blade and the base material 2 is an IN 738 LC stainless steel, and an expected thickness of the protective layer is between 200 $\mu$m and 500 $\mu$m, an alternating electric current in a frequency range of between 2 MHz and 5 MHz is applied to the excitation coil 3. When the method is carried out, the excitation coil 3 through which the high-frequency alternating current is passed is brought near to the layer 1 or brought into mechanical contact therewith. By using the measuring unit 6, a corresponding measurement signal unambiguously related to the impedance is acquired and is processed further in the evaluation unit 7 in order to determine the thickness $d_r$ of the layer 1. By virtue of the high-frequency alternating current of the excitation coil 3, an eddy current is produced in the component 8, which current decays from a surface 10 of the layer 1 into the component 8. The penetration depth d of the eddy current is preferably slightly greater than an expected layer thickness $d_r$, of about 500 $\mu$m or less. The discontinuity in the electrical conductivity between the layer 1 and the base material 2 at the interface between the layer 1 and the base material 2 is particularly great and effects the measurement signal acquired in the measuring unit 6. As a result of the great influence of the discontinuity in the electrical conductivity ($\kappa_1$, $\kappa_2$) between the layer 1 ($\kappa_1$) and the base material 2 ($\kappa_2$) on the measurement signal, unambiguous assignment and determination of the thickness $d_r$ of the layer 1 can take place even with electrical conductivities which are only slightly different. Depending on the application case, in particular the combination of materials for the layer 1 and the base material 2 and the expected thickness of the layer 1, a respectively corresponding frequency f can be determined for the high-frequency alternating electric current of the excitation coil 3.

FIG. 2 shows a representation of the impedance of the excitation coil 3 in the complex plane. The real part of the impedance is plotted along the abscissa and the imaginary part is plotted along the ordinate. The curve of the graph starts at the point denoted "A" and extends to a point denoted "S". The impedance for an open circuit, that is to say essentially the value of the impedance for a measurement of air, is represented at point A. The value at point S corresponds to an ideal short-circuit. The values lying in between correspond to the respective impedances which exist for contact between the excitation coil 3 and the base material 2 consisting continuously of a single material, in particular metal. The values for the stainless steel IN 738 LC and a platinum-aluminum alloy are highlighted by specific points. These two points are joined by a further line which indicates the transition from a single-component material made of IN 738 LC to a two-component material with a layer of the platinum-aluminum alloy applied to the stainless steel. The thickness of the layer increases in the direction of the arrow, the indicated numbers representing the value of the layer in millimeters. Above a particular layer thickness, which is more than 1 mm, a value of the impedance is reached which corresponds to the value of a single-component material made of the platinum-aluminum alloy. The impedance values were measured at a frequency of 200 KHz and are taken from the article titled "Non-destructive Testing of Corrosion Effects on High-temperature Protective Coatings" in VGB-Kraftwerkstechnik 70 (1990), No. 9, pages 645 to 651, by G. Dibelius, H. J. Krichel and U. Reimann.

FIG. 3 schematically shows the profile of the impedance, likewise in the complex plane. The representation is given here in such a way that the value of the impedance for an open circuit lies clearly in the first quadrant, that is to say with positive imaginary and real parts. The values were established on a corrosion protection layer with 30%–32% Co, 30% Ni, 28%–30% Cr, 7%–9% Al, 0.5% Y and about 0.7% Si (specified in per cent by weight), which was applied to the stainless steel IN 738 LC. The continuous line represents the values of the impedance in the case of contact between the excitation coil 3 and the surface 10 of the layer 1. The numerical values specified represent, in micrometers ($\mu$m), the layer thickness determined by the method. It was possible to determine the layer thicknesses in this case to within a maximum error of 30 $\mu$m. The value of the impedance for each layer thickness when the excitation coil 3 is brought near to the layer 1 is represented by the dashed lines. Even these lines are so clearly different from one another that, even without direct contact between the excitation coil 3 and the layer 1, with knowledge of the distance of the excitation coil 3 from the layer 1, the impedance values established can be assigned unambiguously to the thickness $d_r$ of the layer 1. This is even more remarkable since the ratio of the electrical conductivities between the base material 2 and the layer 1 is close to 1.0, in particular is 0.75. The determination of the layer thickness in the case of electrical conductivity values which scarcely differ from each other is no longer possible with frequencies of 500 kHz or less, since the measurement signals are masked by the noise.

The invention is distinguished by a method for determining the thickness of an electrically conductive layer. The method is based on non-destructive eddy-current testing being carried out while selecting a particularly favorable frequency. The selection of the frequency for inducing the eddy current in the component 8 which contains the layer 1 is, for example, carried out in such a way that the penetration depth of the eddy current is preferably slightly greater than the thickness of the layer. As a result, the discontinuity in the electrical conductivity between the layer and the underlying base material has a decisive effect on the impedance of the excitation coil by which the eddy current is produced in the component. The expected layer thickness can, for example, be derived directly from the production process of the component, or can be determined using a test measurement with optionally different frequencies. The method is preferably suitable for checking the thickness of the layer of a newly coated or recoated gas turbine blade in particular a gas turbine compressor blade.

I claim:

1. A method for determining a thickness of a protective layer of a component, which comprises:

providing a component having a protective layer with an electrical conductivity $\kappa_1$ and a base material with an electrical conductivity $\kappa_2$, the protective layer disposed on the base material and the electrical conductivity $\kappa_1$ and the electrical conductivity $\kappa_2$ being different from each other;

applying a high-frequency electric current to an excitation coil, the excitation coil being coupled to a probe coil;

moving the excitation coil near to the protective layer to produce an electric eddy current in at least the protective layer;

determining a parameter related to an impedance of the probe coil, using the determined parameter, according to an eddy-current testing principle, as a basis for determining a thickness of the protective layer; and selecting a frequency of the high-frequency electric current, based on the eddy-current testing principle, to unambiguously determine the thickness of the protective layer where a ratio $\kappa_2/\kappa_1$ of the electrical conductivities is between 0.7 and 1.5.

2. The method according to claim 1, which comprises selecting the frequency to cause a penetration depth of the electric eddy current to be greater than a maximum expected thickness of the protective layer.

3. The method according to claim 2, which comprises selecting the frequency to cause the penetration depth of the electric eddy current to be up to about four times the maximum expected thickness of the protective layer.

4. The method according to claim 1, which comprises selecting the frequency of the high-frequency electric current to be between 1.5 MHz and 3.5 MHz.

5. The method according to claim 1, which comprises selecting the frequency of the high-frequency electric current to be between 2 MHz and 3 MHz.

6. The method according to claim 1, which comprises forming a mechanical contact between the excitation coil and the protective layer where the excitation coil is electrically insulated from the protective layer for determining the parameter related to the impedance of the probe coil.

7. The method according to claim 1, which comprises using a test measurement with a predeterminable test frequency for determining a maximum expected thickness of the protective layer, and determining the frequency based on the predeterminable test frequency used to determined the maximum expected thickness and the conductivities $\kappa_1$ and $\kappa_2$.

8. The method according to claim 1, which comprises:

providing a set of components with known protective layer thicknesses to be used as test specimens;

determining for each of the test specimens the parameter related to the impedance of the probe coil using a plurality of different proximity frequencies; and selecting from the plurality of different proximity frequencies a proximity frequency generating a parameter related to the impedance with a sufficiently high resolution and high linearity as the frequency for the high-frequency electric current.

9. The method according to claim 8, which comprises:

providing preliminary test specimens coated with the protective layer;

using a multiplicity of test frequencies on the preliminary test specimens and monitoring a resolution of the parameter related to the impedance of the probe coil for each test frequencies; and determining which of the multiplicity of test frequencies generate the parameter related to the impedance of the probe coil having a good resolution; and selecting the proximity frequencies from the multiplicity of test frequencies generating the parameter related to the impedance of the probe coil with the good resolution.

10. The method according to claim 9, which comprises providing preliminary test specimens having simple geometric shapes.

11. The method according to claim 1, which comprises comparing the parameter related to the impedance of the probe coil with reference values and determining the thickness of the protective layer from the results of the comparison.

12. The method according to claim 1, which comprises providing a gas turbine blade as the component having the protective layer, the gas turbine blade formed of an MCrAlY alloy type, M standing for a metal selected from the group consisting of iron, nickel, cobalt and an alloy thereof, Cr standing for chromium, Al standing for aluminum, and Y standing for a metal selected from the group consisting of yttrium, hafnium and a similar metal.

* * * * *